United States Patent
Yamanobe et al.

(10) Patent No.: US 12,485,686 B2
(45) Date of Patent: Dec. 2, 2025

(54) INKJET PRINTING DEVICE AND PRINTING METHOD FOR PRINTING AN IMAGE ON A CONTINUOUS MEDIUM

(71) Applicant: FUJIFILM Corporation, Tokyo (JP)

(72) Inventors: Jun Yamanobe, Kanagawa (JP); Takashi Fukui, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 573 days.

(21) Appl. No.: 17/810,492

(22) Filed: Jul. 1, 2022

(65) Prior Publication Data
US 2022/0332131 A1     Oct. 20, 2022

Related U.S. Application Data

(63) Continuation of application No. PCT/JP2020/048825, filed on Dec. 25, 2020.

(30) Foreign Application Priority Data

Jan. 29, 2020  (JP) .................................. 2020-012611

(51) Int. Cl.
*B41J 15/04*     (2006.01)
*B41J 2/01*      (2006.01)
(Continued)

(52) U.S. Cl.
CPC .............. *B41J 15/046* (2013.01); *B41J 2/01* (2013.01); *B41J 2/2114* (2013.01); *B41J 15/048* (2013.01);
(Continued)

(58) Field of Classification Search
CPC . B41J 15/046; B41J 2/01; B41J 15/048; B41J 15/04; B41J 2/2117; B41J 2202/21;
(Continued)

(56) References Cited

U.S. PATENT DOCUMENTS

2009/0116075 A1    5/2009  Arai et al.
2013/0329144 A1   12/2013  Fukasawa et al.

FOREIGN PATENT DOCUMENTS

JP    2009-118255 A    5/2009
JP    2012-086461 A    5/2012
(Continued)

OTHER PUBLICATIONS

International Search Report issued in PCT/JP2020/048825; mailed Mar. 23, 2021.
(Continued)

*Primary Examiner* — Henok D Legesse
(74) *Attorney, Agent, or Firm* — Studebaker Brackett PLLC

(57) ABSTRACT

Provided are an inkjet printing device and a printing method capable of grasping a position of a non-product image, such as a jetting state monitoring pattern, on a continuous medium. An inkjet printing device includes a medium transport mechanism that transports a continuous medium (12) in a medium transport direction, an inkjet head that prints a user image on the continuous medium, one or more processors, and one or more memories that are connected to the processors and store commands which are able to be executed by using the processors, in which the processor reads out the command from the memory and prints non-product image position information (304) including information on a position of a non-product image (302) printed on the continuous medium in the continuous medium at a position (12A) on a downstream side of a region in which the non-product image is printed in the medium transport direction.

16 Claims, 11 Drawing Sheets

(51) Int. Cl.
  *B41J 2/21*   (2006.01)
  *G06F 3/12*   (2006.01)
(52) U.S. Cl.
  CPC .......... *G06F 3/1208* (2013.01); *G06F 3/1251* (2013.01); *G06F 3/1282* (2013.01); *B41J 2/2117* (2013.01); *B41J 15/04* (2013.01); *B41J 2202/21* (2013.01)
(58) Field of Classification Search
  CPC ..... B41J 2/2114; G06F 3/1208; G06F 3/1251; G06F 3/1282
  See application file for complete search history.

(56) References Cited

FOREIGN PATENT DOCUMENTS

| JP | 2012-223884 A | 11/2012 |
|---|---|---|
| JP | 2013-252691 A | 12/2013 |
| JP | 2015-107615 A | 6/2015 |
| JP | 2015-123619 A | 7/2015 |
| JP | 2016-064605 A | 4/2016 |
| JP | 2019217746 A * | 12/2019 |
| WO | 2019/077680 A1 | 4/2019 |

OTHER PUBLICATIONS

International Preliminary Report on Patentability (Chapter I) and Written Opinion of the International Searching Authority issued in PCT/JP2020/048825; issued Jul. 28, 2022.

An Office Action mailed by the Japan Patent Office on Oct. 2, 2023, which corresponds to Japanese Patent Application No. 2021-574556, and is related to U.S. Appl. No. 17/810,492; with English translation.

The extended European search report issued by the European Patent Office on Jun. 14, 2023, which corresponds to European Patent Application No. 20916938.2-1014 and is related to U.S. Appl. No. 17/810,492.

* cited by examiner

INKJET PRINTING DEVICE AND PRINTING METHOD FOR PRINTING AN IMAGE ON A CONTINUOUS MEDIUM

CROSS-REFERENCE TO RELATED APPLICATIONS

The present application is a Continuation of PCT International Application No. PCT/JP2020/048825 filed on Dec. 25, 2020 claiming priority under 35 U.S.C § 119(a) to Japanese Patent Application No. 2020-012611 filed on Jan. 29, 2020. Each of the above applications is hereby expressly incorporated by reference, in its entirety, into the present application.

BACKGROUND OF THE INVENTION

1. Field of the Invention

The present invention relates to an inkjet printing device and a printing method.

2. Description of the Related Art

The inkjet printing device comprising an inkjet head determines a jetting state of the inkjet head, and performs maintenance of the inkjet head as necessary. For example, the inkjet printing device prints a jetting state monitoring pattern in a blank of paper or the like, analyzes reading data obtained by optically reading the jetting state monitoring pattern, and determines the jetting state for each nozzle.

JP2013-252691A discloses an inkjet printing device that uses roll paper rolled into a roll shape. The device disclosed in JP2013-252691A prints a jetting state monitoring pattern at a position between user images, reads the jetting state monitoring pattern by using a charge coupled device (CCD) of a scanner unit, and specifies a nozzle in which a jetting abnormality occurs.

The device classifies a printed material into any of a case in which the jetting abnormality does not occur, a case in which an accidental jetting abnormality occurs, a case in which the accidental jetting abnormality occurs and is recovered spontaneously, or a case in which a continuous jetting abnormality occurs, and transports the printed material to a discharge tray in accordance with the classification.

SUMMARY OF THE INVENTION

However, in a case of an inkjet printing device using a continuous medium, such as roll paper, it is difficult to remove only the jetting state monitoring pattern from a group of the user images. As a result, the jetting state monitoring pattern is transmitted to a post-processing step, such as a cutting step, and the medium on which the jetting state monitoring pattern is printed is confused with the user image.

In the device applied to the post-processing of printing, it is possible to detect and remove a region of the continuous medium on which the jetting state monitoring pattern is printed by applying image detection or the like, but a device that performs the image detection is required, so that the printing device becomes expensive as a whole.

JP2013-252691A does not describe the removal of the jetting state monitoring pattern, and the invention disclosed in JP2013-252691A does not focus on the problem relating to the removal of the jetting state monitoring pattern. It should be noted that there is the problem relating to the removal similar to the jetting state monitoring pattern even in an ink receiving region of the continuous medium in a case in which the jet is performed and the user image or the like which does not fit for sale in which a streak or the like is generated.

The present invention has been made in view of such circumstances, and is to provide an inkjet printing device and a printing method that can grasp a position of a continuous medium of a non-product image, such as a jetting state monitoring pattern, a density unevenness correction pattern, a dummy jet region, and a user image which does not fit for sale.

In order to achieve the object described above, the following aspects of the invention are provided.

A first aspect relates to an inkjet printing device comprising a medium transport mechanism that transports a continuous medium in a medium transport direction, an inkjet head that prints a user image on the continuous medium, one or more processors, and one or more memories that are connected to the processors and store commands which are able to be executed by using the processors, in which the processor reads out the command from the memory and prints non-product image position information including information on a position of a non-product image printed on the continuous medium in the continuous medium at a position on a downstream side of a region in which the non-product image is printed in the medium transport direction.

According to the first aspect, the non-product image position information indicating the position of the non-product image printed on the continuous medium is printed on the continuous medium. As a result, a user can grasp the position of the non-product image in the continuous medium.

In addition, since the non-product image position information is printed at the position on the downstream side of the non-product image in the medium transport direction, the non-product image position information can be recognized prior to the non-product image in a case in which post-processing of the continuous medium is performed from a termination side of the continuous medium in a case of printing.

Two or more inkjet heads may be provided. The two or more inkjet heads may correspond to inks of different colors, respectively.

A second aspect relates to the inkjet printing device according to the first aspect, in which the processor prints the non-product image position information by using the inkjet head.

According to the second aspect, the non-product image position information can be printed by using the inkjet head provided in the inkjet printing device.

A third aspect relates to the inkjet printing device according to the first aspect further comprising a head for non-product image position information printing that is different from the inkjet head and that is used in a case of printing the non-product image position information.

According to the third aspect, printing of the non-product image position information can be performed even in a case in which the inkjet head cannot be used, such as during maintenance of the inkjet head provided in the inkjet printing device.

A fourth aspect relates to the inkjet printing device according to the second or third aspect, in which the processor prints the non-product image position information in a termination region of the continuous medium in printing of the user image.

According to the fourth aspect, the post-processing of the printed continuous medium is often started from the termination region of the continuous medium in printing of the user image. In such a case, the user can grasp the non-product image position information at the start of the post-processing.

A fifth aspect relates to the inkjet printing device according to the second or third aspect, in which the processor prints the non-product image position information in a termination region of a print job in the medium transport direction.

According to the fifth aspect, in a case in which the post-processing is performed for each print job, the user can grasp the non-product image position information at the start of the post-processing.

A sixth aspect relates to the inkjet printing device according to the second or third aspect, in which the processor prints the non-product image position information in a next image printing region in which the non-product image is printed in the medium transport direction.

According to the sixth aspect, even in a case in which it is difficult to print the non-product image position information on the termination region of the continuous medium and the termination region of the print job, the non-product image position information can be printed on the continuous medium.

A seventh aspect relates to the inkjet printing device according to the sixth aspect, in which the processor prints the non-product image position information in an end region of the continuous medium in a direction orthogonal to the medium transport direction.

According to the seventh aspect, the non-product image position information can be printed on a user image printing region in which the user image is printed.

An eighth aspect relates to the inkjet printing device according to the sixth or seventh aspect, in which the processor prints the non-product image position information by using a transparent ink.

According to the eighth aspect, the non-product image position information can be printed to be superimposed on the user image.

In the eighth aspect, an inkjet head for jetting the transparent ink may be provided, or a head for non-product image position information printing that jets the transparent ink may be provided.

A ninth aspect relates to the inkjet printing device according to any one of the first to eighth aspects, in which the non-product image position information includes a length in the medium transport direction corresponding to a length of the user image.

According to the ninth aspect, in a case in which the non-product image is removed, the position of the non-product image can be searched by using the cumulative number of images of the user image.

A tenth aspect relates to the inkjet printing device according to any one of the first to ninth aspects, in which the non-product image position information includes jetting state information indicating a jetting state of the inkjet head.

According to the tenth aspect, a notification of the jetting state of the inkjet head can be given.

An eleventh aspect relates to a printing method comprising transporting a continuous medium in a medium transport direction, printing an image on the continuous medium by using an inkjet head, and printing non-product image position information including information on a position of a non-product image formed on the continuous medium in the continuous medium at a position on a downstream side of a region in which the non-product image is printed in the medium transport direction.

According to the eleventh aspect, the same effects as those of the first aspect can be obtained.

In the eleventh aspect, the same matters as those specified in the second to tenth aspects can be appropriately combined. In that case, the components that carry the processing or functions specified in the inkjet printing device can be grasped as the components of the printing method that carry the corresponding processing or functions.

According to the present invention, the non-product image position information indicating the position of the non-product image printed on the continuous medium is printed on the continuous medium. As a result, the user can grasp the position of the non-product image in the continuous medium.

In addition, since the non-product image position information is printed at the position on the downstream side of the non-product image in the medium transport direction, the non-product image position information can be recognized prior to the non-product image in a case in which post-processing of the continuous medium is performed from a termination side of the continuous medium in a case of printing.

DESCRIPTION OF THE PREFERRED EMBODIMENTS

Figure 1:
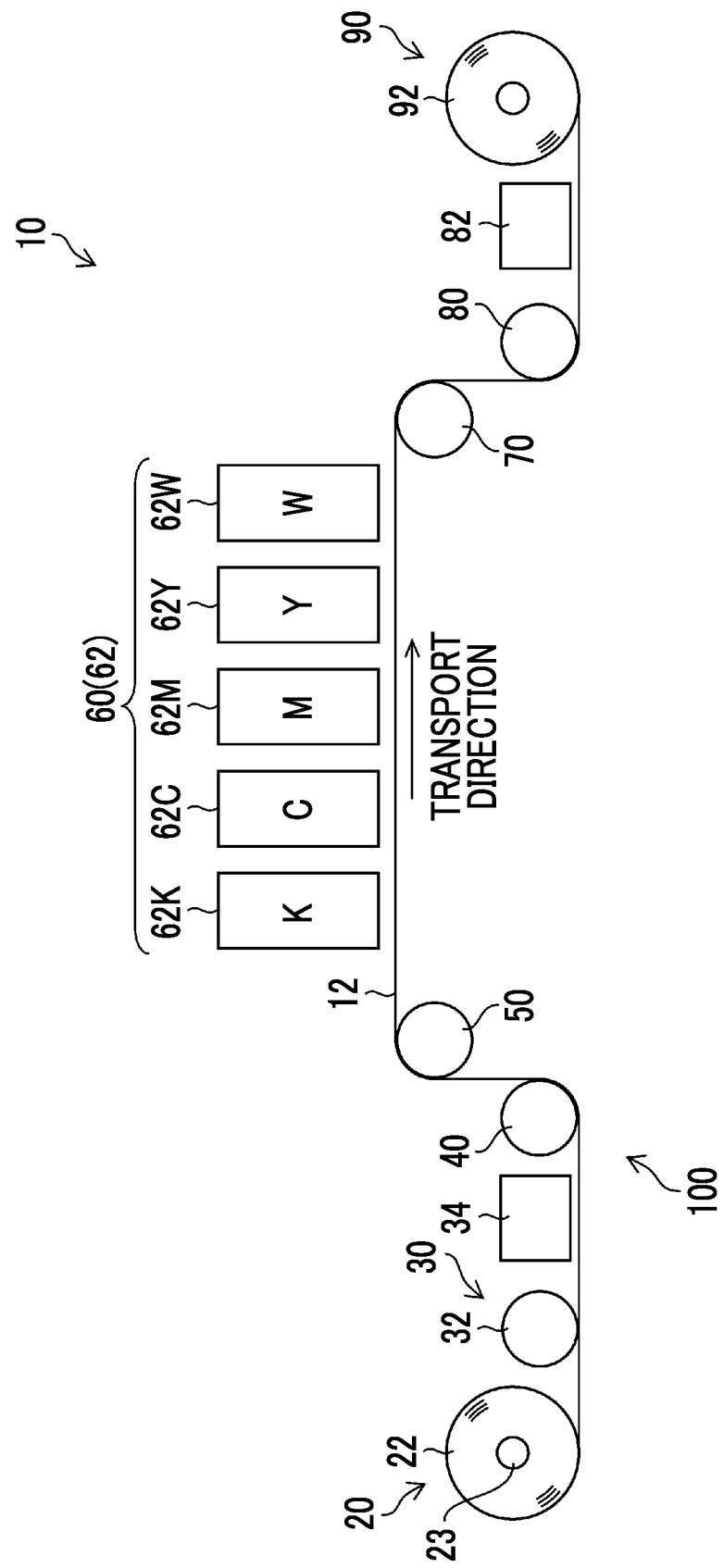
FIG. 1 is an overall configuration diagram of a printing device according to a first embodiment.

In the following, preferred embodiments of the present invention will be described in detail with reference to the accompanying drawings. In the present specification, the same reference numerals will be given to the same components and repetitive description thereof will be appropriately omitted.

First Embodiment

[Overall Configuration of Printing Device]

FIG. 1 is an overall configuration diagram of a printing device according to a first embodiment. A printing device 10 is a roll-to-roll type inkjet printing device that prints an image on a substrate 12, which is a continuous medium, by a single pass method.

The substrate 12 is a non-permeation medium, for example, a transparent film substrate used for flexible package. Here, the term "non-permeation" means having non-permeability with respect to an aqueous primer and an aqueous ink described below. The flexible package means package by a material that is deformed depending on a shape of an article to be packaged. A long sheet material, such as paper, cloth, a resin sheet, and a metal sheet, can be applied to the substrate 12. A permeation medium may be applied to the substrate 12.

Transparency means that a transmittance of visible light is 30% or more and 100% or less, preferably 70% or more and 100% or less. The substrate 12 may be, for example, oriented nylon (ONY), oriented poly propylene (OPP), polyethylene terephthalate (PET), or the like.

The printing device 10 includes an unwinding unit 20, a pre-coat unit 30, a pre-coat drying unit 34, a first suction drum 40, a second suction drum 50, a jetting unit 60, a third suction drum 70, a fourth suction drum 80, an image sensor 82, and a winding unit 90.

A transport path of the substrate 12 from the unwinding unit 20 to the winding unit 90 is referred to as a substrate transport path. A transport direction of the substrate along the substrate transport path is called a substrate transport direction. Regarding the substrate transport path, an upstream side means a side close to the unwinding unit 20, and a downstream side means a side close to the winding unit 90. It should be noted that the substrate transport direction described in the embodiment is an example of a medium transport direction.

Along the substrate transport path from the unwinding unit 20, the pre-coat unit 30, the pre-coat drying unit 34, the first suction drum 40, the second suction drum 50, the jetting unit 60, the third suction drum 70, the fourth suction drum 80, the image sensor 82, and the winding unit 90 are disposed in this order.

A substrate transport mechanism 100 that transports the substrate 12 unwound from the unwinding unit 20 to the winding unit 90 along the substrate transport path is a roll-to-roll transport mechanism including the first suction drum 40, the second suction drum 50, the third suction drum 70, and the fourth suction drum 80.

It should be noted that the unwinding unit 20 and the winding unit 90 may be provided in the substrate transport mechanism 100. In addition, in addition to the configuration shown in FIG. 1, the substrate transport mechanism 100 may be composed of one or more elements, such as a pass roller, a drive roller, and a non-contact transport unit that function as guide rollers. The substrate transport mechanism 100 can transport the substrate 12 at a certain transportation speed. It should be noted that the pass roller and the drive roller are not shown.

Here, the term speed as used in the present specification can include the concept of velocity expressed as an absolute value of speed. That is, the term speed may be read as velocity. It should be noted that the substrate transport mechanism 100 described in the embodiment is an example of a medium transport mechanism.

An unwinding roll 22 is disposed in the unwinding unit 20. The unwinding roll 22 is a non-printed substrate 12, and is a roll in which the non-printed substrate 12 is rolled in a roll shape. The unwinding unit 20 comprises an unwinding device that rotatably supports a core 23 of the unwinding roll 22, and unwinds the substrate 12 from the unwinding roll 22.

A winding roll 92 is disposed in the winding unit 90. The winding roll 92 is a roll in which the printed substrate 12 subjected to printing by using the jetting unit 60 is wound into a roll shape. The winding unit 90 comprises a winding device. A winding reel held by the winding device is connected to one end of the substrate 12 unwound from the unwinding unit 20.

The winding device comprises a winding motor. The winding motor rotates and drives the winding reel. By rotating the winding reel, the substrate 12 is wound by the winding roll 92. It should be noted that the winding device, the winding reel, and the winding motor are not shown.

The printing device 10 adopts a two-liquid configuration in which the pre-coat unit 30 applies an undercoating liquid to the substrate 12 before printing in the jetting unit 60, and then printing is performed. That is, the pre-coat unit 30 is disposed on the upstream side of the jetting unit 60 in the substrate transport path. An ink composition and the undercoating liquid are used to realize high-speed inkjet printing and obtain an image having high density and high resolution and excellent reproducibility of fine lines and fine portions even in high-speed printing.

The pre-coat unit 30 applies the aqueous primer as the undercoating liquid to a printing surface of the substrate 12. The aqueous primer includes a component that aggregates or insolubilizes the coloring material component in water and the aqueous ink. An aspect containing a component that thickens water and an ink may be applied to the aqueous primer.

Examples of an application amount of the aqueous primer include about one tenth of an application amount of the aqueous ink by using the jetting unit 60. Examples of the viscosity of the aqueous primer include 0.5 centipoise or more and 5.0 centipoise or less. It should be noted that 1 centipoise is 0.001 pascal seconds.

Examples of a configuration example of the pre-coat unit 30 include an aspect in which a chamber doctor type coater is applied. The coater comprises a coating roller 32, a chamber, and a blade. The chamber is a container that stores the aqueous primer. The coating roller 32 is rotated in accordance with the rotation of the motor connected to a rotating shaft.

The aqueous primer is supplied from the chamber to a surface of the coating roller 32. The blade scrapes off excess aqueous primer on the surface of the rotating coating roller 32. The coating roller 32 applies the aqueous primer on the printing surface of the substrate 12 by interposing the substrate 12 between the coating roller 32 and an opposing roller and bring a roller surface on which the aqueous primer is supplied into contact with the printing surface of the substrate 12. It should be noted that the chamber, the blade, the motor, and the opposing roller are not shown.

The coater is not limited to the chamber doctor type coater, and a direct gravure coater may be applied or a kiss reverse coater may be applied. In addition, a method of applying the undercoating liquid is not limited to a roller coating method, and an inkjet method may be applied.

The pre-coat drying unit 34 performs processing of drying the aqueous primer applied to the printing surface of the substrate 12 by using the pre-coat unit 30. The pre-coat drying unit 34 comprises a hot air heater. Examples of the hot air heater include an aspect comprising a slit nozzle over the entire width of the substrate 12.

The pre-coat drying unit 34 blows hot air from the slit nozzle of the hot air heater toward the printing surface of the substrate 12 to dry the aqueous primer. It should be noted that the hot air heater and the slit nozzle are not shown.

The substrate 12 on which the aqueous primer is dried is transported to the jetting unit 60 via the first suction drum 40 and the second suction drum 50. As the first suction drum 40, the non-contact transport unit that blows air to the substrate 12 to perform floating transportation, and performs direction conversion in which a traveling direction of the substrate 12 is bent in a direction of the printing surface side of the substrate 12 without contacting the printing surface of the substrate 12 can be applied.

In the first suction drum 40 shown in FIG. 1, an example will be described in which the traveling direction of the substrate 12 transported in a horizontal direction in the pre-coat drying unit 34 is turned upward by 90 degrees, but an angle of direction conversion is not limited to 90 degrees, and can be any angle of 180 degrees or less at an angle exceeding 0 degrees.

The substrate 12 in which the traveling direction of the substrate 12 is bent by the first suction drum 40 is transported to the second suction drum 50. The second suction drum 50 is disposed on the upstream side of the jetting unit 60 in the substrate transport path.

The second suction drum 50 is rotated in accordance with to the rotation of the motor connected to the rotating shaft, and sucks and transports the substrate 12 to an outer peripheral surface. The second suction drum 50 comprises a plurality of suction holes in the outer peripheral surface of the drum. The second suction drum 50 sucks the substrate 12 on the outer peripheral surface by using a negative pressure generated in the suction holes sucked by a pump. It should be noted that the motor, the suction holes, and the pump are not shown.

The substrate 12 transported by using the second suction drum 50 is transported to the third suction drum 70. A configuration of the third suction drum 70 is the same as the configuration of the second suction drum 50. A transport tension is applied to the substrate 12 by giving a difference in rotation speed between a rotation speed of the third suction drum 70 and a rotation speed of the drive roller. The transport tension is a tensile force that is received by the substrate 12 in the traveling direction of the substrate 12. It should be noted that the drive roller is not shown.

The jetting unit 60 is disposed on the substrate transport path between the second suction drum 50 and the third suction drum 70. The jetting unit 60 comprises an inkjet head 62K, an inkjet head 62C, an inkjet head 62M, an inkjet head 62Y, and an inkjet head 62W.

In the following, the inkjet head 62K, the inkjet head 62C, the inkjet head 62M, the inkjet head 62Y, and the inkjet head 62W may be collectively referred to as inkjet heads 62.

The inkjet heads 62 are print heads that jet black, cyan, magenta, yellow, and white aqueous inks, respectively. The aqueous ink refers to an ink obtained by dissolving or dispersing a coloring material, such as a dye and a pigment, in water and a water-soluble solvent.

In the present embodiment, an aspect will be described in which the aqueous pigment ink is applied to the aqueous ink. Organic pigments are applied to the pigments of the black, cyan, magenta, and yellow aqueous inks. Titanium oxide is applied to the pigment of the aqueous white ink. The viscosity of each aqueous ink is 0.5 centipoise or more and 5.0 centipoise or less. The aqueous ink thickens by reacting with the aqueous primer.

The aqueous ink is supplied to each of the inkjet heads 62 from ink tanks of corresponding colors via a pipe path. It should be noted that the ink tank and the pipe path are not shown.

An ink supply system of each inkjet head 62 comprises an ink temperature adjustment device. The ink temperature adjustment device adjusts a temperature of the ink to maintain the temperature of the ink at a designated ink temperature. Examples of a configuration example of the ink temperature adjustment device include an aspect comprising a temperature sensor, a heater, and a controller. The temperature sensor detects the ink temperature. The heater heats the ink. The controller controls the heater based on a detection signal of the temperature sensor. It should be noted that the ink temperature adjustment device, the temperature sensor, and the controller are not shown.

The inkjet heads 62 are line-type heads capable of performing single-pass printing in which the substrate 12 transported by the substrate transport mechanism 100 is scanned once and printing is performed. A serial type may be applied to the inkjet heads 62. A plurality of nozzles that jet the ink are formed in a nozzle surface of the inkjet head 62. A two-dimensional disposition can be applied to the plurality of nozzles. In addition, a water-repellent film is formed on the nozzle surface of each inkjet head 62.

Each inkjet head 62 can be configured by connecting a plurality of head modules to each other in a width direction of the substrate 12. It should be noted that the nozzle surface, the nozzle, and the water-repellent film are not shown. It should be noted that the width direction of the substrate 12 is a direction orthogonal to the substrate transport direction and indicates a direction parallel to the printing surface of the substrate 12. In the following, the width direction of the substrate 12 may be described as a substrate width direction.

Liquid droplets of the ink are jetted from the inkjet heads 62 toward the printing surface of the substrate 12 transported by using the substrate transport mechanism 100. The liquid droplets of the jetted ink adhere to the substrate 12, and the image is printed on the printing surface of the substrate 12. The ink applied to the printing surface of the substrate 12 in the jetting unit 60 is subjected to a condensation thickening reaction by the aqueous primer applied to the printing surface of the substrate 12 in the pre-coat unit 30.

In the present embodiment, an aspect has been described in which four color inks of black, cyan, magenta, and yellow, and white ink are used, but the ink color and the number of colors are not limited to the present embodiment.

For example, an aspect using light color inks, such as light magenta and light cyan, and an aspect using special color inks, such as green, orange, violet, clear inks, and a metallic ink may be applied. In addition, a plurality of inkjet heads 62 that jet the inks of the same color may be disposed.

A disposition order of the inkjet heads 62 of respective colors is not particularly limited, but since the white ink is used in a case of printing a white background image, the inkjet head 62W is preferably disposed at a position on the downstream side of the inkjet head 62Y or the like that jets non-white ink. In an aspect in which the non-transparent substrate 12 is applied, the inkjet head 62W may not be provided.

Figure 4:
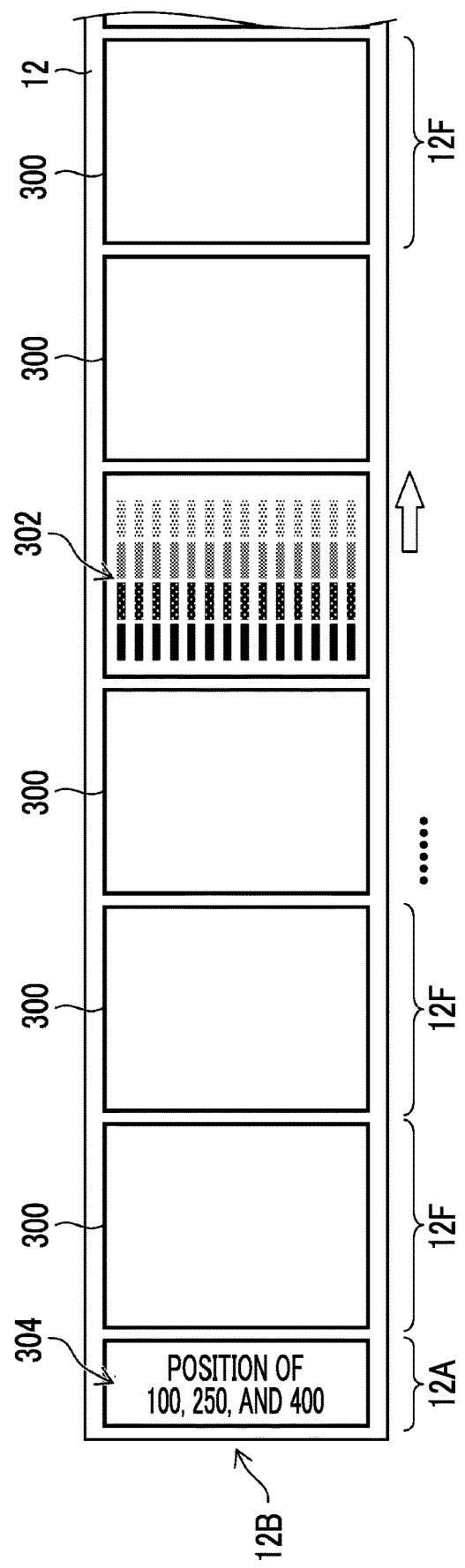
FIG. 4 is a schematic diagram of a substrate on which non-product image position information is printed.

The jetting unit 60 prints a jetting state monitoring pattern for each inkjet head 62 on the printing surface of the substrate 12. The jetting state monitoring pattern is shown in FIG. 4 using a reference numeral 302. It should be noted that the details of the jetting state monitoring pattern will be described below.

The fourth suction drum 80 is disposed on the substrate transport path between the third suction drum 70 and the winding unit 90. A configuration of the fourth suction drum 80 is the same as the configuration of the first suction drum 40.

The image sensor 82 reads the jetting state monitoring pattern printed on the substrate 12. The printing device 10 analyzes the reading data of the jetting state monitoring pattern and determines jetting states of the inkjet heads 62.

As the image sensor 82, a CCD line sensor in which a plurality of photoelectric conversion elements are arranged in a row may be applied, or a CCD area sensor in which a plurality of photoelectric conversion elements are arranged two-dimensionally may be applied.

As the image sensor 82, an aspect having a length corresponding to the entire width of the image printed on the printing surface of the substrate 12 may be applied, or an aspect of performing scanning along the substrate width direction to read the entire width of the image printed on the printing surface of the substrate 12 may be applied.

[Electrical Configuration of Inkjet Printing Device]

Figure 2:
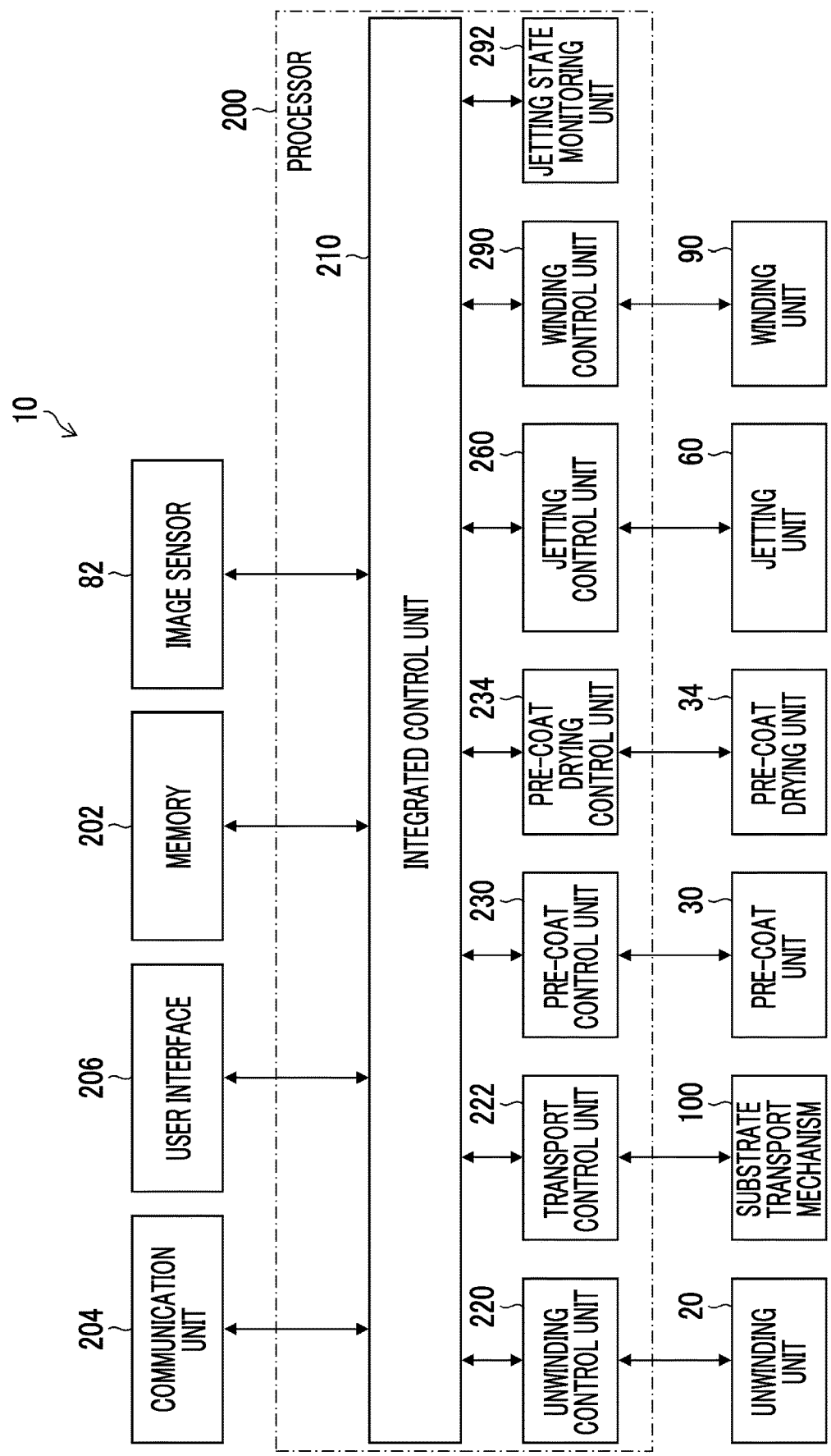
FIG. 2 is a functional block diagram showing the printing device shown in FIG. 1.

FIG. 2 is a functional block diagram showing the printing device shown in FIG. 1. The printing device 10 comprises one or more processors 200 and one or more memories 202. In addition, the printing device 10 comprises a communication unit 204 and a user interface 206.

The communication unit 204 includes a wired or wireless communication interface. The printing device 10 acquires image data or the like, which is a printing target, via the communication unit 204. The user interface 206 includes an input device and a display device for a user to operate the printing device 10.

As the input device, various input devices, such as an operation panel, a keyboard, a mouse, a touch panel, and a trackball, that receive input from the user can be adopted. The input device may be an appropriate combination thereof. Examples of the display device include a display that displays the image data and various pieces of information. The user operates the input device to cause the printing device 10 to print a user image.

The memory 202 stores various programs including a command that can be executed by using the processor 200. The memory 202 stores various data necessary for executing the programs. The memory 202 can be composed of a magnetic storage device, such as a hard disk, and a computer-readable medium, such as a semiconductor memory, which is a tangible object. The memory 202 may include a temporary storage region for various data.

The memory 202 can be composed of a plurality of storage devices and the like. The plurality of storage devices and the like can include a plurality of different types of storage devices and the like. The storage device and the like constituting the memory 202 may be divided into a plurality of storage regions.

The processor 200 executes the programs stored in the memory 202 to realize various functions of the printing device 10. Each unit shown as a component of the processor 200 corresponds to various functions of the printing device 10.

An integrated control unit 210 performs various pieces of processing in accordance with the programs stored in the memory 202, and performs the overall integrated control of the printing device 10.

An unwinding control unit 220 controls the rotation of the motor in the unwinding unit 20, and controls the unwinding operation of the substrate 12.

A transport control unit 222 controls the operation of the substrate transport mechanism 100. The unwinding unit 20 and the winding unit 90 may be provided in the substrate transport mechanism 100. The transport control unit 222 comprises a suction drum control unit that controls the rotation of the motor connected to the second suction drum 50 and the like shown in FIG. 1, and rotates each component at a defined speed to transport the substrate 12 by a roll-to-roll method.

The suction drum control unit controls a rotation speed and a suction pressure of the second suction drum 50 and the like. The suction drum control unit can function as a tension control unit that controls the transport tension of the substrate 12. It should be noted that the suction drum control unit is not shown.

In a case in which the non-contact transportation is applied to the first suction drum 40 and the fourth suction drum 80, the transport control unit 222 can comprise a non-contact transport control unit. The non-contact transport control unit controls a temperature of the floating transport air and an air volume of air from an outlet.

A pre-coat control unit 230 controls the coater of the pre-coat unit 30. That is, the pre-coat control unit 230 controls the rotation of the motor that drives the coating roller 32, rotates the coating roller 32 at a defined speed, and applies the aqueous primer to the printing surface of the substrate 12 by the coating roller 32.

A pre-coat drying control unit 234 controls the temperature, the air volume, and the like of the hot air heater provided in the pre-coat drying unit 34 to dry the undercoating liquid applied to the substrate 12.

A jetting control unit 260 controls the ink jetting operations of the inkjet heads 62 in the jetting unit 60 based on the image data, which is the printing target. The jetting control unit 260 includes an image processing unit that performs various pieces of transformation processing, correction processing, halftone processing, or the like on the image data, which is the printing target. The transformation processing includes transformation of the number of pixels, gradation transformation, color transformation, and the like. The correction processing includes density correction, non-jetting correction for suppressing the visibility of a defect due to the non-jetting nozzle, and the like.

The jetting control unit 260 jets the liquid droplets of the aqueous inks, such as black, cyan, magenta, and yellow, toward the substrate 12 at a timing when the substrate 12 passes through a position facing the nozzle surfaces of the inkjet heads 62 by using the inkjet heads 62. As a result, a color image is printed on the printing surface of the substrate 12.

The color image printed on the printing surface of the substrate 12 includes the user image as a product image and a non-product image, such as the jetting state monitoring pattern. It should be noted that the user image is shown in FIG. 4 using a reference numeral 300.

The jetting control unit 260 jets the liquid droplets of the white aqueous ink from the inkjet head 62W toward the substrate 12 at the timing when the substrate 12 passes through the position facing the nozzle surface of the inkjet head 62W. As a result, the white background image is printed on the printing surface of the substrate 12. The white background image is not limited to the image printed on the entire surface of the region of the color image, and may be an image selectively printed with respect to the region of the color image.

The jetting control unit 260 prints non-product image position information at a defined position on the substrate 12 by using the inkjet heads 62. The non-product image position information is information indicating a position on which the non-product image is printed on the substrate 12. At least one of the inkjet head 62K or the like can be applied to the inkjet heads 62 that print the non-product image position information.

The winding control unit 290 controls the rotation of the motor in the winding unit 90 and rotates the winding roll 92 to control the winding operation of the substrate 12.

A jetting state monitoring unit 292 determines the jetting states of the inkjet heads 62 based on the reading data of the jetting state monitoring pattern transmitted from the image sensor 82. The jetting state monitoring unit 292 stores the jetting state of each inkjet head 62 using a defined memory. The memory 202 can be applied to the defined memory.

[Detailed Description of Jetting Control Unit]

Figure 3:
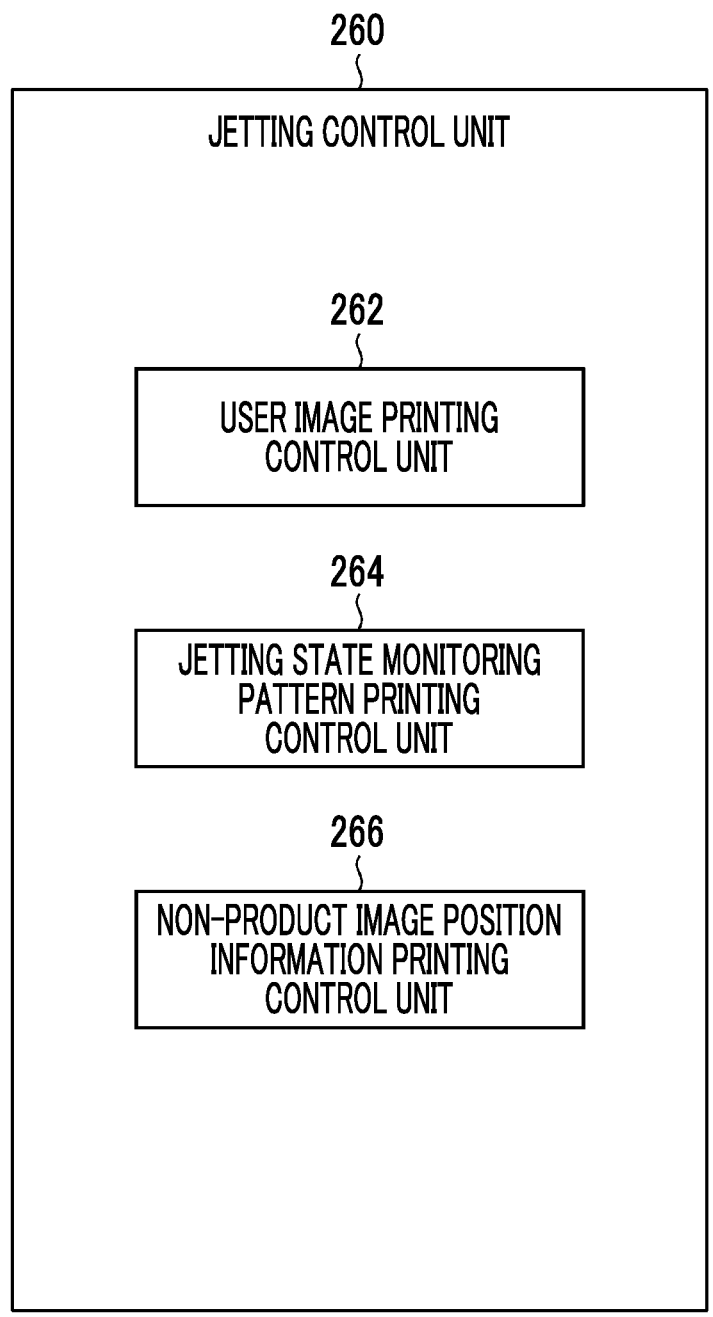
FIG. 3 is a functional block diagram of a jetting control unit shown in FIG. 2.

FIG. 3 is a functional block diagram of the jetting control unit shown in FIG. 2. The jetting control unit 260 comprises a user image printing control unit 262, a jetting state monitoring pattern printing control unit 264, and a non-product image position information printing control unit 266.

Figure 7:
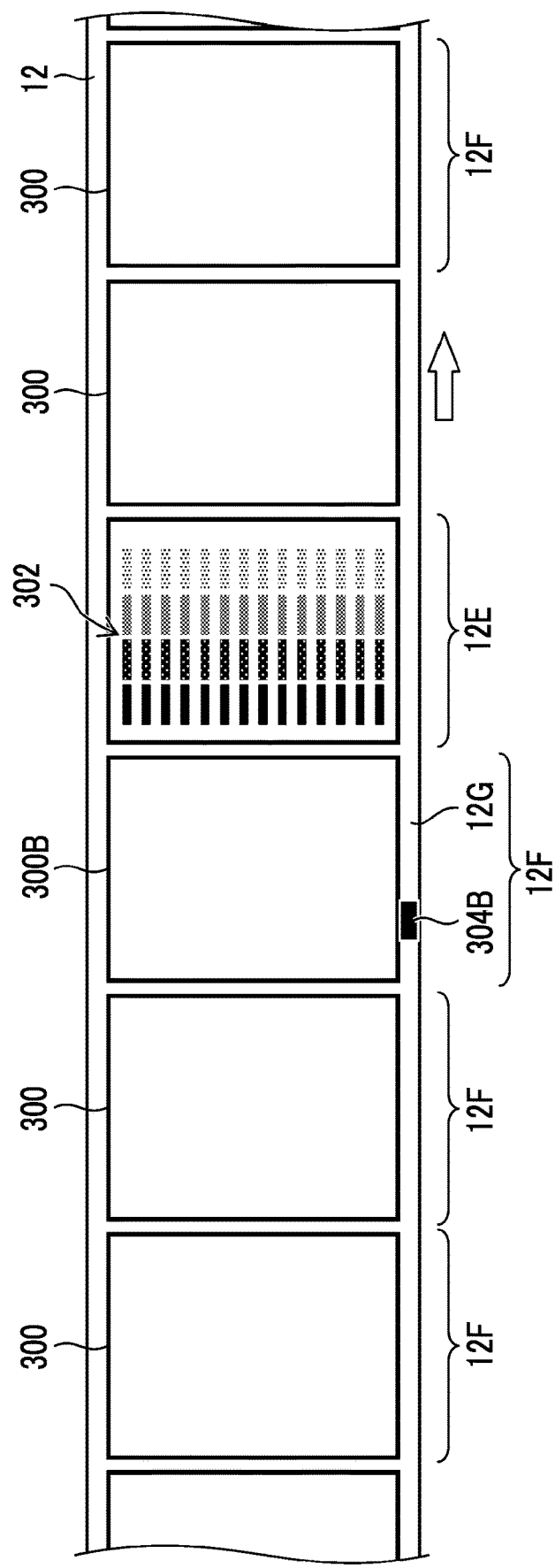
FIG. 7 is a schematic diagram of the substrate on which the non-product image position information is printed in a user image printing region behind a jetting state monitoring pattern printing region on which a jetting state monitoring pattern is printed.

The user image printing control unit 262 controls the jetting of the inkjet heads 62 based on defined printing settings in a case in which the user image is printed on a user image printing region on the substrate 12 on which the user image is printed. A printing condition can include the number of images, an image quality, and the like. It should be noted that the user image printing region is shown in FIG. 7 using a reference numeral 12F.

The jetting state monitoring pattern printing control unit 264 controls jetting of the inkjet heads 62 in a case in which the jetting state monitoring pattern is printed on the substrate 12. The jetting state monitoring pattern printing control unit 264 stores information on a position of the jetting state monitoring pattern on the substrate 12 by using the defined memory. The memory 202 can be applied to the defined memory. The cumulative number of images from the first printed image of the substrate 12 can be applied to the position of the jetting state monitoring pattern The non-product image position information printing control unit 266 controls jetting of the inkjet heads 62 in a case in which the non-product image position information is printed on the substrate 12. The non-product image position information printing control unit 266 reads out the position information of the jetting state monitoring pattern stored in the defined memory, and prints the non-product image position information at a defined position of the substrate 12.

[Hardware Configuration of Each Processing Unit and Control Unit]

Various processors can be applied to the hardware of a processing unit that executes the various pieces of processing shown in FIGS. 2 and 3. It should be noted that the processing unit may be called a processing device. The various processors include a central processing unit (CPU), a programmable logic device (PLD), an application specific integrated circuit (ASIC), and the like.

The CPU is a general-purpose processor that executes a program to function as various processing units. The PLD is a processor of which a circuit configuration is changeable after manufacturing. Examples of the PLD include a field programmable gate array (FPGA). The ASIC is a dedicated electric circuit having a circuit configuration specifically designed to execute specific processing.

One processing unit may be composed of one of these various processors, or may be composed of two or more processors of the same type or different types. For example, one processing unit may be composed of a plurality of FPGAs and the like. One processing unit may be composed of a combination of one or more FPGAs and one or more CPUs.

In addition, a plurality of processing units may be composed of one processor. As an example in which the plurality of processing units are composed of one processor, there is a form in which one processor is composed of the combination of one or more CPUs and software and one processor functions as the plurality of processing units. Such a form is represented by a computer, such as a client terminal device and a server device.

As another configuration example, there is a form in which a processor that realizes entire functions of a system including the plurality of processing units using one IC chip is used. Such a form is represented by a system on chip. It should be noted that IC is an abbreviation for integrated circuit. In addition, the system on chip may be expressed as SoC using an abbreviation for system on chip.

As described above, the various processing units are composed of one or more of the various processors described above as the hardware structure. Further, more specifically, the hardware structure of the various processors is an electric circuit (circuitry) in which circuit elements, such as semiconductor elements, are combined.

[Detailed Description of Non-Product Image Position Information]

FIG. 4 is a schematic diagram of the substrate on which the non-product image position information is printed. It should be noted that an arrow line shown in FIG. 4 indicates the substrate transport direction. The same applies to the arrow lines shown in FIGS. 6, 7, and 8.

A plurality of user images 300, the jetting state monitoring pattern 302, and a non-product image position information 304 are printed on the substrate 12 shown in FIG. 4. On the printing surface of the substrate 12, the jetting state monitoring pattern 302 is interposed between the user images 300.

The jetting state monitoring pattern 302 is printed for each inkjet head 62. A Known technology, such as a ladder pattern and a gradation pattern, can be applied to the jetting state monitoring pattern 302. The jetting state monitoring pattern 302 is read by using the image sensor 82 shown in FIG. 1.

The printing device 10 monitors the jetting state of each nozzle provided in the inkjet heads 62 based on the reading data of the jetting state monitoring pattern 302. The nozzle of which the jetting state deteriorates is corrected by using surrounding nozzles. The correction can include streak correction, unevenness correction, and the like.

Text information indicating the position at which the jetting state monitoring pattern 302 is printed on the substrate 12 is applied to the non-product image position information 304. For the non-product image position information 304, a bar code, a two-dimensional code, and the like may be applied instead of the text information, or the bar code, the two-dimensional code, and the like may be appropriately combined.

On the substrate 12 shown in FIG. 4, the non-product image position information 304 is printed in a printing termination region 12A. The printing termination region 12A of the substrate 12 has a defined length from a termination 12B of the substrate 12 in the substrate transport direction. The length of the printing termination region 12A in the substrate transport direction can be equal to or less than a length of the user image printing region 12F in the substrate transport direction.

In the printing termination region 12A, the jetting state monitoring pattern 302 or the like may not be able to be printed on a portion having a certain length from the termination 12B of the substrate 12 in the substrate transport direction. The jetting state monitoring pattern 302 is printed at a position separated from the termination 12B of the substrate 12 by a certain distance by avoiding the region in which the jetting state monitoring pattern 302 cannot be printed.

A length of the non-product image position information 304 in the substrate transport direction can be optionally defined within a range not exceeding a size of the user image 300 in the substrate transport direction. Similarly, a length of the non-product image position information 304 in the substrate width direction can be optionally defined within a range not exceeding a size of the user image 300 in the substrate width direction.

Since the substrate 12 on which the user image 300 or the like is printed is processed from the side of the printing termination region 12A in the post-processing, in a case in which the non-product image position information 304 is printed on the printing termination region 12A of the substrate 12, the user can visually recognize the non-product image position information 304 immediately after the start of the post-processing.

For example, in a case in which a rejector that cuts the substrate 12 is applied as a post-processing device, the position of the jetting state monitoring pattern 302 can be grasped immediately after the start of the cutting processing. As a result, it is easy to separate the user image 300 and the jetting state monitoring pattern 302 in a case in which the jetting state monitoring pattern 302 is discarded.

The length of the jetting state monitoring pattern 302 in the substrate transport direction can be equal to or less than a length of the user image printing region 12F in the same direction. An aspect is preferable in which the length of the jetting state monitoring pattern 302 in the substrate transport direction is the same as the length of the user image printing region 12F in the same direction. According to such an aspect, an operation pattern of post-processing, such as the cutting cycle in cutting, can be fixed.

In a case in which the length of the jetting state monitoring pattern 302 in the substrate transport direction is less than the length of the user image printing region 12F in the same direction, the non-product image position information 304 may include information on the length of the jetting state monitoring pattern 302 in the substrate transport direction.

[Procedure of Printing Method According to First Embodiment]

Figure 5:
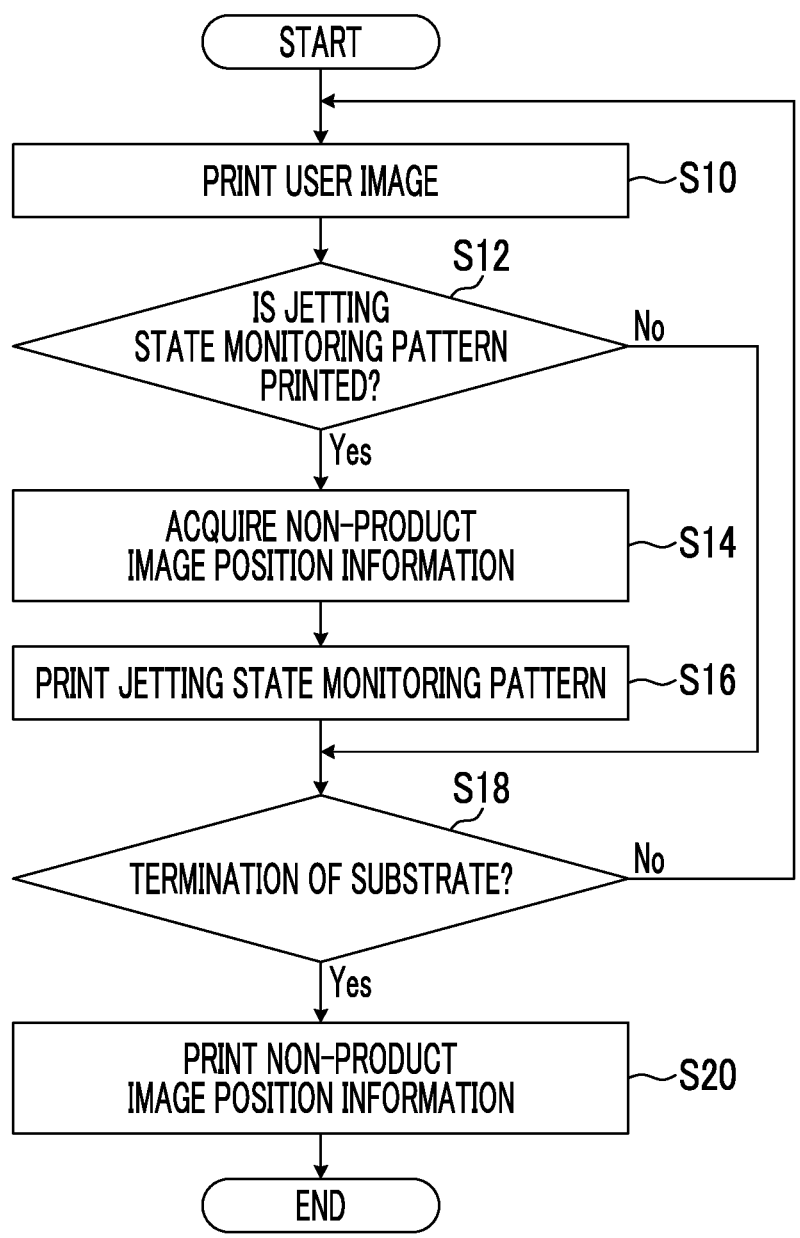
FIG. 5 is a flowchart showing a procedure of a printing method according to the first embodiment.

FIG. 5 is a flowchart showing a procedure of a printing method according to the first embodiment. In a user image printing step S10, the user image printing control unit 262 shown in FIG. 3 prints the user image 300 on the substrate 12 transported by using the substrate transport mechanism 100. After the user image printing step S10, the process proceeds to a jetting state monitoring pattern printing determination step S12. It should be noted that a step of transporting the substrate 12 by using the substrate transport mechanism 100 described in the embodiment is an example of a medium transport step.

In the jetting state monitoring pattern printing determination step S12, the jetting state monitoring pattern printing control unit 264 determines whether or not a printing start condition of the jetting state monitoring pattern 302 is satisfied. As the printing start condition of the jetting state monitoring pattern 302, the cumulative number of images of the user image 300, the quality of the user image 300, and the like can be applied.

In the jetting state monitoring pattern printing determination step S12, in a case in which it is determined that the jetting state monitoring pattern printing control unit 264 does not satisfy the printing start condition of the jetting state monitoring pattern 302, a No determination is made. In a case in which a No determination is made, the process proceeds to a substrate termination determination step S18.

On the other hand, in the jetting state monitoring pattern printing determination step S12, in a case in which the jetting state monitoring pattern printing control unit 264 determines that the printing start condition of the jetting state monitoring pattern 302 is satisfied, a Yes determination is made. In a case in which a Yes determination is made, the process proceeds to a non-product image position information acquisition step S14.

In the non-product image position information acquisition step S14, the non-product image position information printing control unit 266 acquires the information on the position at which the jetting state monitoring pattern 302 is printed in the substrate transport direction. The cumulative number of images of the user image 300 immediately before or immediately behind the jetting state monitoring pattern 302 can be applied to the information on the position at which the jetting state monitoring pattern 302 is printed.

FIG. 4 shows the non-product image position information 304 indicating that the jetting state monitoring pattern 302 is printed at the position immediately behind the user image 300 in which the cumulative number of images is 100, 250, and 400.

Returning to FIG. 5, after the non-product image position information acquisition step S14, the process proceeds to a jetting state monitoring pattern printing step S16. In the jetting state monitoring pattern printing step S16, the jetting state monitoring pattern printing control unit 264 prints the jetting state monitoring pattern 302 by using the inkjet heads 62. After the jetting state monitoring pattern printing step S16, the process proceeds to the substrate termination determination step S18.

In the substrate termination determination step S18, the user image printing control unit 262 determines whether or not the position of the user image printing region 12F of the next user image 300 exceeds the position of the termination 12B of the substrate 12. In the substrate termination determination step S18, in a case in which the user image printing control unit 262 determines that the position of the user image printing region 12F of the next user image 300 does not exceed the position of the termination 12B of the substrate 12, a No determination is made.

In a case in which a No determination is made, the process returns to the user image printing step S10, and steps from the user image printing step S10 to the substrate termination determination step S18 are repeatedly performed until a Yes determination is made in the substrate termination determination step S18.

On the other hand, in the substrate termination determination step S18, in a case in which the user image printing control unit 262 determines that the position of the user image printing region 12F of the next user image 300 exceeds the position of the termination 12B of the substrate 12, a Yes determination is made. In a case in which a Yes determination is made, the process proceeds to a non-product image position information printing step S20.

In the non-product image position information printing step S20, the non-product image position information printing control unit 266 prints the non-product image position information 304 on the printing termination region 12A of the substrate 12. After the non-product image position information printing step S20, the printing device 10 performs defined end processing to end the printing method.

[Modification Example of Non-Product Image Position Information Printing]

Figure 6:
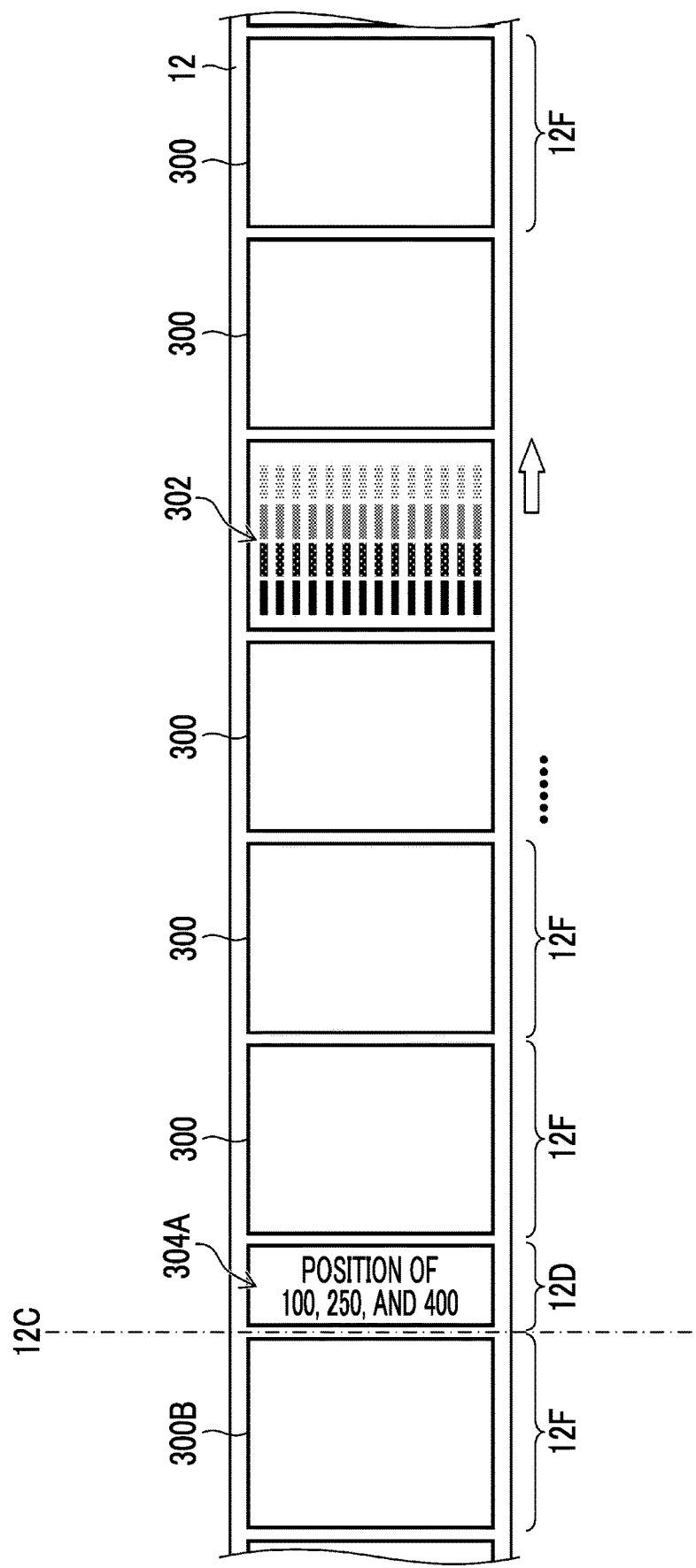
FIG. 6 is a schematic diagram of the substrate on which the non-product image position information is printed in a termination region of a print job.

FIG. 6 is a schematic diagram of the substrate on which the non-product image position information is printed in a termination region of a print job. On the substrate 12 shown in FIG. 6, the user image 300 and a user image 300B relating to different print jobs are printed with a separation position 12C of the print job as a boundary.

On the substrate 12, non-product image position information 304A is printed in a termination region 12D of the print job performed earlier. The termination region 12D is a region immediately behind a final user image 300A performed earlier, and has a length described in a direction opposite to the substrate transport direction from the separation position 12C of the print job. The non-product image position information 304A includes the text information indicating a print job number, the information on a printing position of the jetting state monitoring pattern 302, and the like.

In a case in which the substrate 12, which is the continuous medium, is used, there is a gap between the print job performed earlier and the print job performed next in the substrate transport direction due to the acceleration/deceleration of the substrate 12. In the gap between the print jobs, the non-product image position information 304A can be printed.

In a case in which the non-product image position information 304A shown in FIG. 6 is printed, a job end determination step is performed instead of the substrate termination determination step S18 shown in FIG. 5. In the job end determination step, it is determined whether or not a defined number of images are printed in the print job performed earlier. In a case in which the defined number of images are not printed, the process proceeds to the user image printing step S10 to continue printing of the user image. In a case in which the defined number of images are printed, the process proceeds to the non-product image position information printing step S20.

FIG. 7 is a schematic diagram of the substrate on which the non-product image position information is printed in the user image printing region behind the jetting state monitoring pattern printing region on which the jetting state monitoring pattern is printed. Non-product image position information 304B shown in FIG. 7 is printed in the user image printing region 12F next to a jetting state monitoring pattern printing region 12E in which the jetting state monitoring pattern 302 is printed.

In a case in which the print job is performed in which a large number of user images 300 are printed without stopping printing by connecting a plurality of substrates 12, it may not be possible to print the non-product image position information 304 and the like shown in FIG. 4 on in the printing termination region 12A of the substrate 12 and the termination region 12D of the print job.

Therefore, the non-product image position information 304B is printed in the user image printing region 12F next to the jetting state monitoring pattern printing region 12E in which the jetting state monitoring pattern 302 is printed. As a result, the non-product image position information 304B can be printed even in a case in which the print job is performed in which a large number of user images 300 are printed without stopping printing by connecting the plurality of substrates 12.

Marking printed on a blank 12G of the user image printing region 12F in the medium width direction is applied to the non-product image position information 304B. FIG. 7 shows a quadrangle filled with any color as an example of the marking. It should be noted that the blank 12G shown in FIG. 7 is an example of the end region of the continuous medium in a direction orthogonal to the medium transport direction.

A figure of the marking applied to the non-product image position information 304B is not limited to a quadrangle, and any figure, such as a triangle, a polygon having a pentagon or more, a circle, and an ellipse, can be applied. The non-product image position information 304B is not limited to the figure, and the text information may be applied or the image, such as the bar code, may be applied to in the non-product image position information 304 shown in FIG. 4. As the non-product image position information 304B, the text information indicating the position of the jetting state monitoring pattern 302 shown in FIG. 4 may be applied.

The inkjet head 62 that jets the transparent ink may be provided, and the non-product image position information 304B may be printed by using the transparent ink. In a case in which the non-product image position information 304B is printed by using the transparent ink, the non-product image position information 304B may be printed to be superimposed on the user image 300. For example, even in a case in which the user image 300 is formed over the entire length of the substrate 12 in the substrate width direction, the non-product image position information 304B can be printed to be superimposed on the user image 300 by using the transparent ink.

The transparent ink need only have a certain degree of transmittance such that a region to which the transparent ink adheres can be visually recognized. Examples of the transmittance include 30% or more and 100% or less. The transparent ink may be referred to as the clear ink.

In a case in which the non-product image position information 304B is printed, the substrate termination determination step S18 and the non-product image position information printing step S20 are replaced in the flowchart shown in FIG. 5. That is, the non-product image position information printing step S20 is performed after the jetting state monitoring pattern printing step S16. The substrate termination determination step S18 is performed after the non-product image position information printing step S20.

Operations and Effects of First Embodiment

The printing device 10 and the printing method according to the first embodiment can obtain the following operations and effects.

[1]

The non-product image position information 304 indicating the position of the jetting state monitoring pattern 302 printed on the substrate 12, which is the continuous medium, is printed. As a result, the user can grasp the position of the jetting state monitoring pattern 302 on the substrate 12.

[2]

As the non-product image position information 304, the non-product image position information 304 is printed in the printing termination region 12A of the substrate 12. As a result, the position of the non-product image position information 304 on the substrate 12 can be grasped at the start of the post-processing of printing.

[3]

The non-product image position information 304A is printed in the termination region 12D of the print job of the substrate 12. As a result, in an aspect in which the printed substrate 12 is accommodated for each print job, which is a case in which the user images 300 of a plurality of print jobs are mixed on one substrate 12, the position of the non-product image position information 304 on the substrate 12 can be grasped at the start of the post-processing of printing for each print job.

[4]

The non-product image position information 304B is printed in the user image printing region 12F next to the jetting state monitoring pattern printing region 12E in which the jetting state monitoring pattern 302 is printed. As a result, the non-product image position information 304B can be printed on the substrate 12 even in a case in which there is no space for printing the non-product image position information 304B in the printing termination region 12A of the substrate 12 and the termination region 12D of the print job.

Second Embodiment

[Description of Non-Product Image Information]

Figure 8:
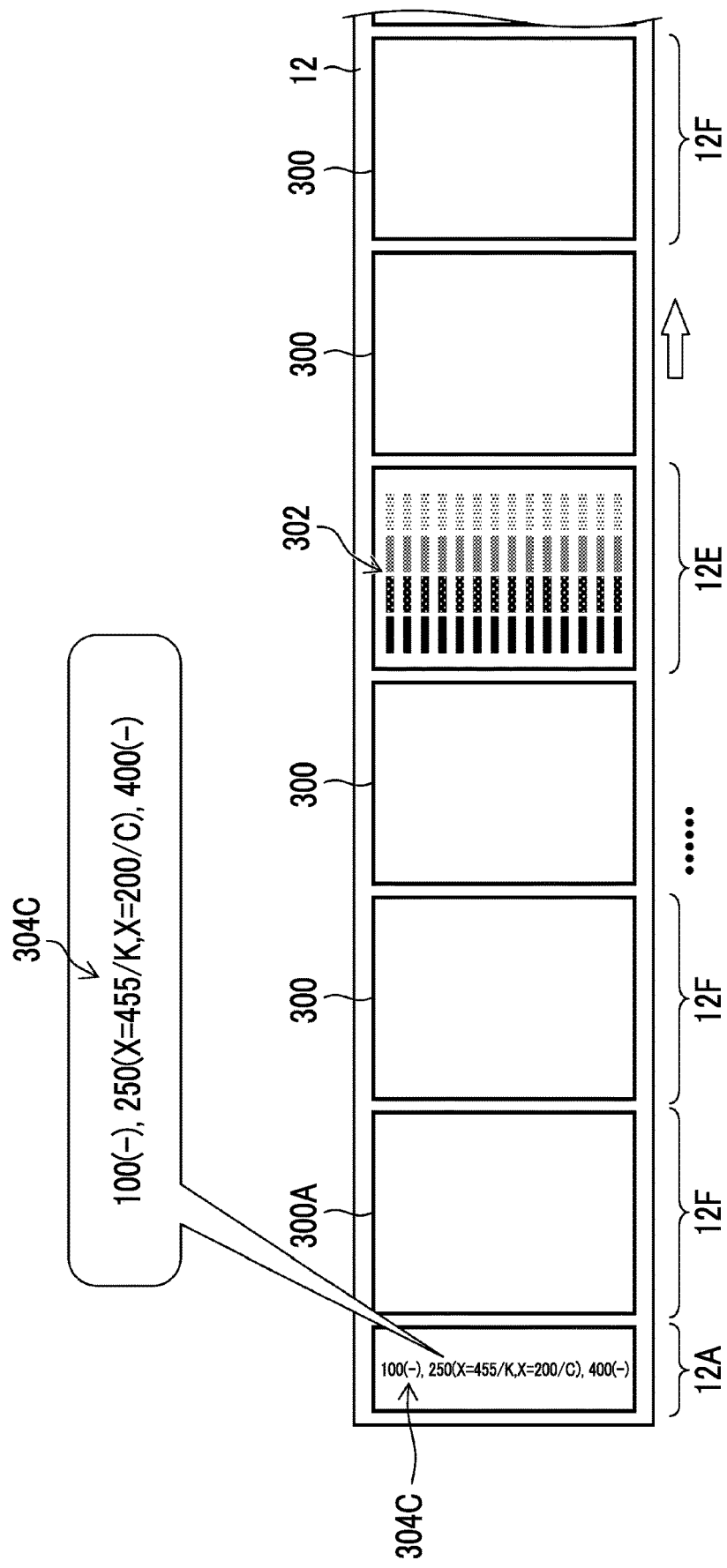
FIG. 8 is a schematic diagram of a substrate on which jetting state monitoring pattern position information is printed by using a printing device according to a second embodiment.

FIG. 8 is a schematic diagram of a substrate on which jetting state monitoring pattern position information is printed by using a printing device according to a second embodiment. A non-product image position information 304C shown in FIG. 8 includes the position information and the jetting state information of the jetting state monitoring pattern 302. Information on a difference from the previous jetting state monitoring pattern 302 can be applied to the jetting state information.

As a result, the user can recognize whether or not there is a defect, such as streak and unevenness, between a timing when the previous jetting state monitoring pattern 302 is printed and a timing when the current jetting state monitoring pattern 302 is printed.

Each of the numbers 100, 250 and 400 constituting the non-product image position information 304C indicates the position of the jetting state monitoring pattern 302. That is, the non-product image position information 304C indicates that the jetting state monitoring pattern 302 is printed in the jetting state monitoring pattern printing region 12E immediately behind the user image printing region 12F on which the user image 300 having the cumulative number of images 100, 250, and 400 is printed.

A symbol, number, and the like in parentheses printed behind the numbers indicates the jetting state information. A hyphen (-) indicates no change. X=455/K indicates that the jetting state of the inkjet head 62K that jets the black ink is changed, and a position at which the jetting state is changed is a position in the vicinity of 455 mm from the defined end in the substrate width direction.

Similarly, X=200/C indicates that the jetting state of the inkjet head 62C that jets the cyan ink is changed, and a position at which the jetting state is changed is a position in the vicinity of 200 mm from the defined end in the substrate width direction. It should be noted that the hyphen after the cumulative number of images of 400 indicates that the change in the jetting state of the black ink and the cyan ink is maintained.

That is, the jetting state information includes information on the ink color in which the jetting state is changed and information on the position at which the jetting state is changed in the substrate width direction. As a result, the user can grasp the positions of the inkjet heads 62 having a possibility of the occurrence of the jetting abnormality, such as the streak and unevenness, and the position from the defined end in the substrate width direction. The user can extract, as a sample, any image from the user image 300 having the cumulative number of images of 101 to the user image 300 having the cumulative number of images of 400, and can examine the sample based on the information on the ink color and the position information included in the non-product image position information 304C, so that it is easy to examine shipping of the user image 300.

In an aspect in which the non-product image position information 304 is printed immediately behind the jetting state monitoring pattern 302, the number of images from the jetting state monitoring pattern 302 to the non-product image position information 304 is fixed, so that the number indicating the cumulative number of images shown in FIG. 8 may be omitted, and only the jetting state information may be included.

[Procedure of Printing Method]

Figure 9:
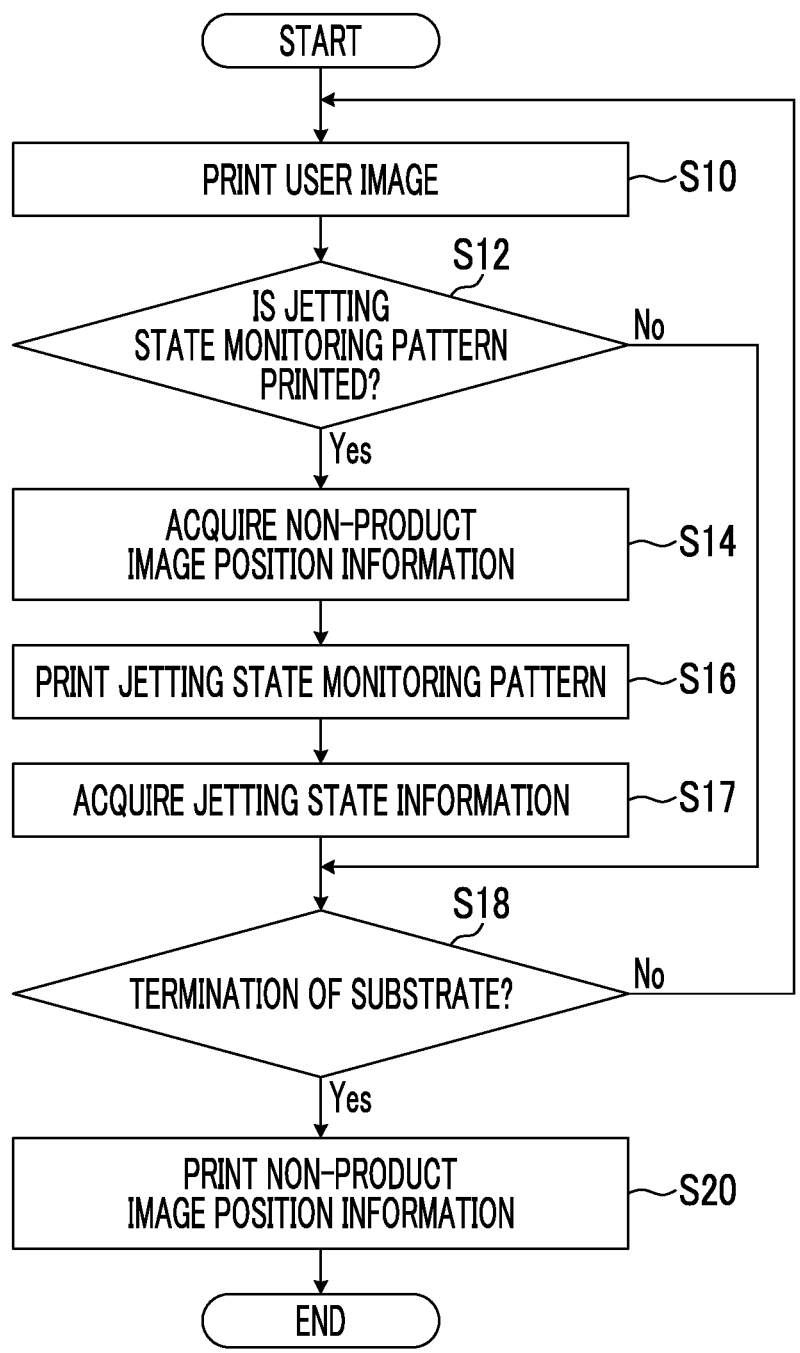
FIG. 9 is a flowchart showing a procedure of a printing method according to the second embodiment.

FIG. 9 is a flowchart showing a procedure of a printing method according to the second embodiment. In the printing method shown in FIG. 9, a jetting state information acquisition step S17 is added between the jetting state monitoring pattern printing step S16 and the substrate termination determination step S18 of FIG. 5.

In the jetting state information acquisition step S17, the non-product image position information printing control unit 266 shown in FIG. 2 acquires the jetting state information for each inkjet head 62. In the non-product image position information printing step S20, the non-product image position information printing control unit 266 prints the non-product image position information 304B including the jetting state information.

Operations and Effects of Second Embodiment

The printing device 10 and the printing method according to the second embodiment can obtain the following operations and effects.

[1]

The non-product image position information 304C includes the jetting state information indicating the jetting states of the inkjet heads 62. As a result, a notification of the jetting state for each inkjet heads 62 can be given by using the non-product image position information 304C.

[2]

The jetting state information includes the information on the ink color in which the jetting state is changed, and the information on a distance from the defined end in the substrate width direction. As a result, the user can extract the sample from among the plurality of user images 300 printed after the jetting state is changed, and can examine the sample.

Third Embodiment

[Configuration of Printing Device]

Figure 10:
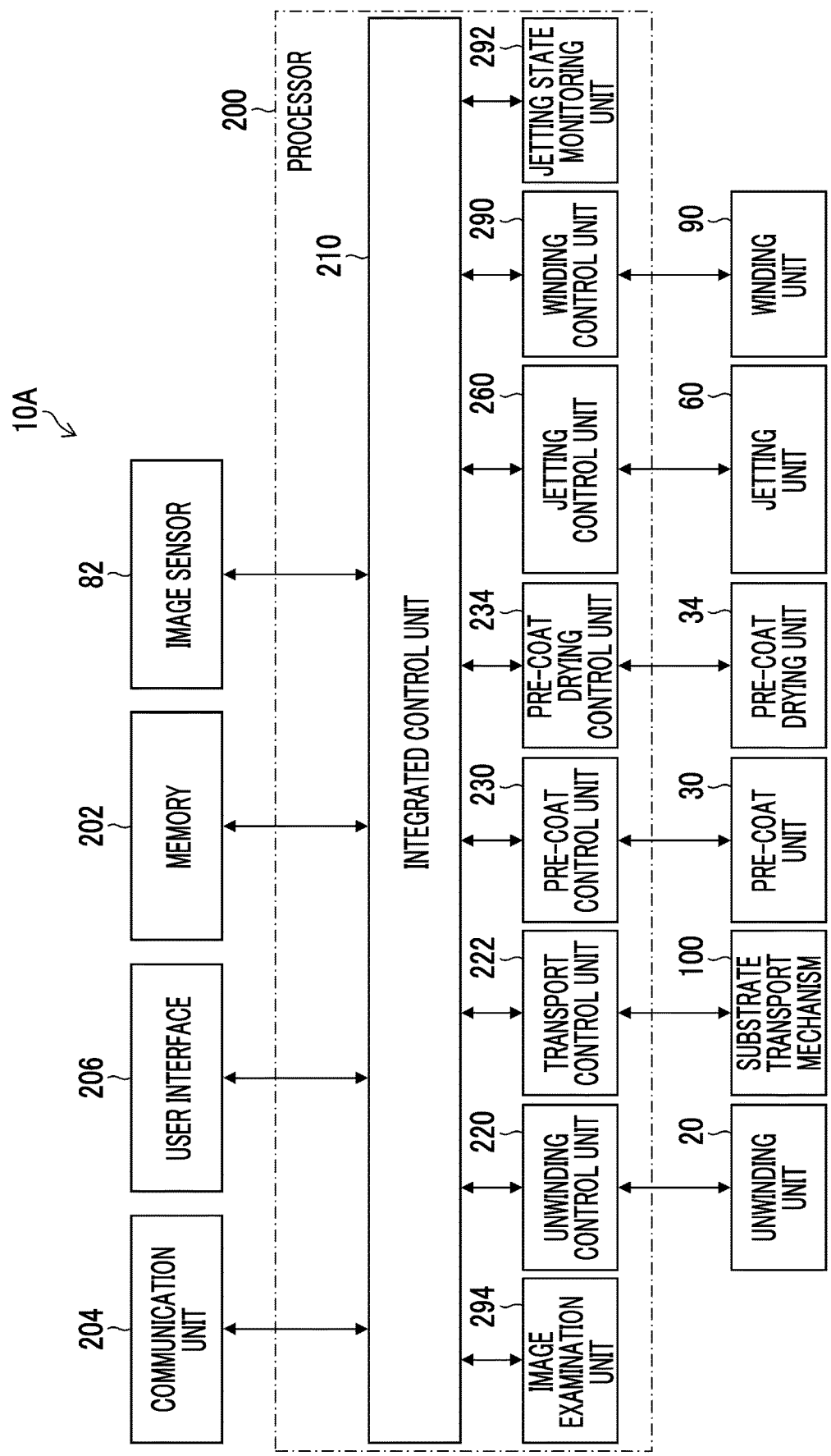
FIG. 10 is a functional block diagram of a printing device according to a third embodiment.

FIG. 10 is a functional block diagram of a printing device according to a third embodiment. In a printing device 10A according to the third embodiment, an image examination unit 294 is added to the printing device 10 shown in FIG. 2 and the like. The image examination unit 294 compares the reading data of the user image 300 with the printed image data, and determines whether or not there is a defect in the user image 300, which is an examination target. A known method may be applied to the examination of the user image 300. Here, the details of the examination of the user image 300 are omitted.

The image examination unit 294 stores an examination result for each user image 300. The image examination unit 294 stores at least the information on the position of the user image 300 in which a defect is present. The jetting state monitoring unit 292 prints the non-product image position information 304 including the information on the position of the user image 300 in which a defect is present by using the inkjet heads 62.

The image sensor 82 can be applied to read the user image 300. The memory 202 can be applied to store the examination result for each user image. Of course, a dedicated imaging apparatus that examines the user image may be provided. In addition, a dedicated storage device that stores the examination result for each user image may be provided. The image examination unit 294 may include the imaging apparatus, such as the image sensor 82.

[Other Examples of Non-Product Image]

In addition to the jetting state monitoring pattern 302 shown in FIG. 4 and the user image 300 in which a defect is present, the region of the substrate 12 used as an ink receiver of the dummy jet may be applied to the non-product image.

That is, in printing of the continuous user images 300, in a case in which the ink of the dummy jet is jetted to the region between the user images 300, the non-product image position information 304 including the position of the region at which the dummy jet is performed may be printed.

Operations and Effects of Third Embodiment

The printing device 10A according to the third embodiment can obtain the following operations and effects.

[1]

The non-product image position information 304 including the position of the user image in which there is a defect, such as the streak and unevenness, is printed. As a result, the user can grasp the position of the user image 300 in which the defect is present, and can easily remove the user image 300 in which the defect is present.

[2]

The region of the substrate 12 that serves as the ink receiver for the dummy jet can be applied to the non-product image. As a result, the user can grasp the position of the non-product image, such as the region that serves as the ink receiver of the dummy jet, and can easily remove the non-product image.

[Modification Example of Printing Device]

Instead of the winding roll 92, the printing device 10 and the like shown in FIG. 1 may comprise a tray that folds and accommodates the printed substrate 12. In addition, instead of the winding roll 92, the rejector that cuts the substrate 12 and the tray that accommodates the cut user image and the like may be provided.

The printing device 10 and the like shown in FIG. 1 may comprise a dedicated head for non-product image position information printing that prints the non-product image position information 304 shown in FIG. 4.

The printing device 10 and the like shown in FIG. 1 may set the length of the non-product image position information 304 shown in FIG. 4 in the substrate transport direction in accordance with the length of the user image 300 in the substrate transport direction. For example, a ratio of the length of the non-product image position information 304 in the substrate transport direction to the length of the user image 300 in the substrate transport direction may be set.

[Application Example to Printing System]

Figure 11:
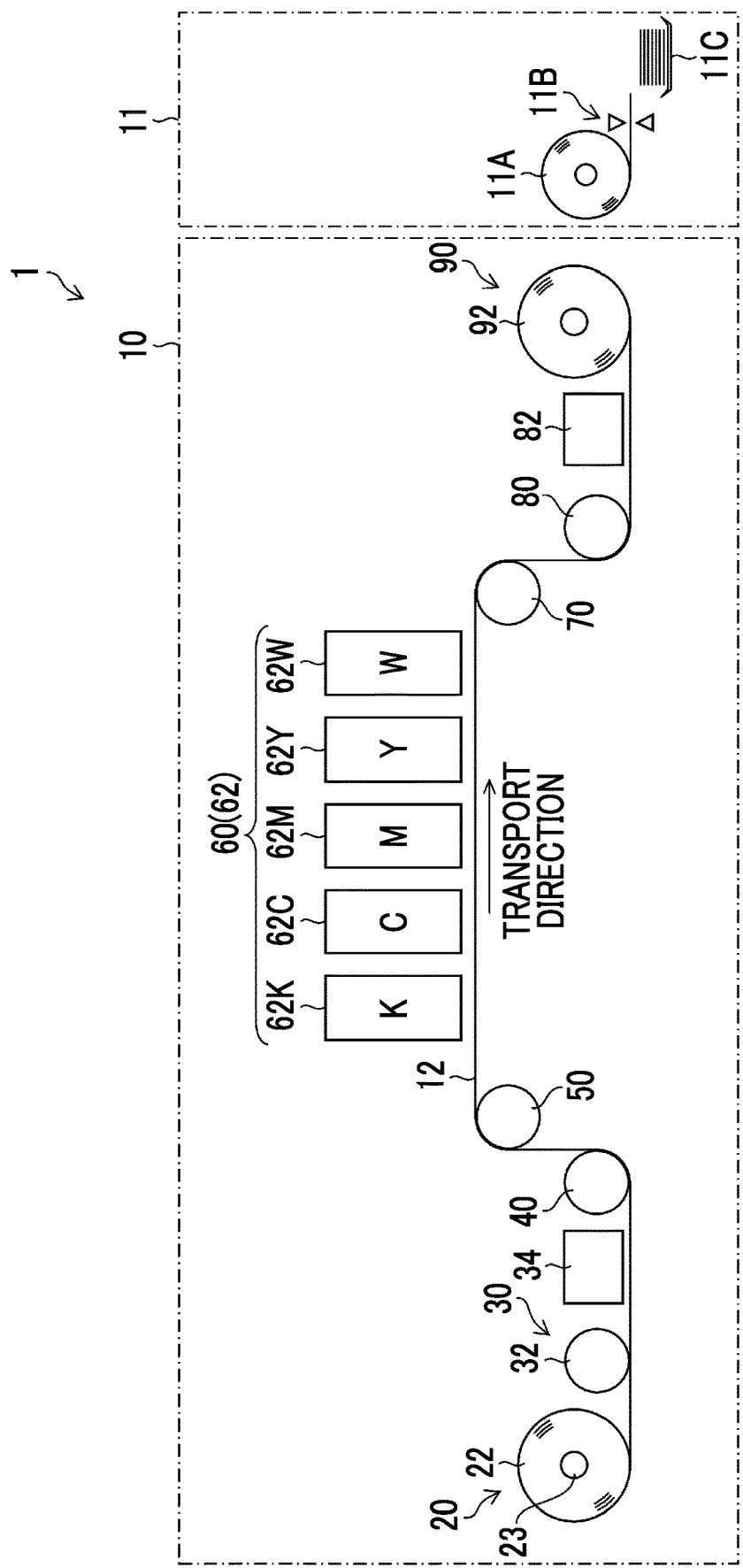
FIG. 11 is an overall configuration diagram of a printing system according to an application example.

FIG. 11 is an overall configuration diagram of a printing system according to an application example. A printing system 1 shown in FIG. 11 comprises the printing device 10 and a rejecting device 11. Any of the printing device shown in the second embodiment or the printing device 10A shown in the third embodiment can be applied to the printing system 1 instead of the printing device 10.

The rejecting device 11 comprises a roll holding mechanism 11A that holds the printed substrate 12 rolled in a roll shape, a cutter 11B that cuts the substrate 12, and a tray 11C that accommodates the cut substrate 12.

The printing system 1 may comprise a transport device that transports the printed substrate 12 rolled in a roll shape from the printing device 10 to the rejecting device 11.

[Regarding Jetting Method of Inkjet Head]

An ejector of the inkjet head is composed of a nozzle that jets the ink and a pressure chamber leading to the nozzle, and a jetting energy generation element that gives the jetting energy to the ink in the pressure chamber. Regarding a jetting method of jetting the liquid droplets of the ink from the nozzle of the ejector, means for generating the jetting energy is not limited to a piezoelectric element, and various jetting energy generation elements, such as a heating element and an electrostatic actuator, can be applied. For example, a method of jetting the liquid droplets by using a pressure of film boiling caused by heating the ink by the heating element can be employed. The jetting energy generation element corresponding to the jetting method of the inkjet head is provided in a flow channel structure.

[Example of Undercoating Liquid]

The undercoating liquid may be referred to as a preconditioning liquid, a pre-coat liquid, a pretreatment liquid, a treatment liquid, or the like. The undercoating liquid contains at least an aggregating agent that aggregates the components in the ink composition of the ink, and can be further made of other components, as necessary.

The aggregating agent may be a compound capable of changing pH of the ink composition, a polyvalent metal salt, or polyallylamines. As the aggregating agent, an acidic substance having high water solubility can be used, and organic acid is preferable, divalent or higher organic acid is more preferable, and divalent or higher and trivalent or lower acidic substance is particularly preferable, in terms of increasing aggregating properties and immobilizing the entire ink. Specifically, suitable examples thereof include phosphoric acid, oxalic acid, malonic acid, and citric acid. The aggregating agent can be used alone or in combination of two or more.

The undercoating liquid can further contain other additives as other components within a range that does not impair a desired aggregation effect. Examples of other additives include known additives, such as an anti-drying agent (wetting agent), an antifading agent, an emulsion stabilizer, a penetration enhancer, an ultraviolet absorbing agent, a preservative, an antibacterial agent, a pH adjusting agent, a surface tension adjuster, an antifoaming agent, a viscosity adjuster, a dispersing agent, a dispersion stabilizer, a rust inhibitor, and a chelating agent. It should be noted that the anti-drying agent may be called a wetting agent.

Regarding Terms

The term printing device is synonymous with terms, such as a printing machine, a printer, a typing device, an image recording device, an image forming device, an image output device, and a drawing device. The image is interpreted in a broad sense and includes a color image, a monochrome image, a single color image, a gradation image, a uniform density image, and the like.

The image is not limited to a photographic image and is used as a collective term including a design, a text, a symbol, a line drawing, a mosaic pattern, a color-coding pattern, other various patterns, and an appropriate combination thereof.

The term printing includes concepts of terms, such as recording of the image, forming of the image, typing, drawing, and printing. The term device can include the concept of a system.

Application Example to Program Invention

A program corresponding to the printing device and printing method described in the present specification can be configured. That is, it is possible to configure a program realizing the functions of each unit shown in FIG. 2 and the like and each step shown in FIG. 5 and the like on a computer.

In the embodiments of the present invention described above, the configuration requirements can be appropriately changed, added, or deleted without departing from the spirit of the present invention. The present invention is not limited to the embodiments described above, and various modifications can be made by those having ordinary knowledge in the art within the technical idea of the present invention. In addition, the embodiments, modification example, and application example may be appropriately combined and performed.

EXPLANATION OF REFERENCES

1: printing system
10: printing device
10A: printing device
11: rejecting device
11A: roll holding mechanism
11B: cutter
11C: tray
12: substrate
12A: printing termination region
12B: termination
12C: separation position of print job
12D: termination region
12E: jetting state monitoring pattern printing region
12F: user image printing region
12G: blank
20: unwinding unit
22: unwinding roll
23: core
30: pre-coat unit
32: coating roller
34: pre-coat drying unit
40: first suction drum
50: second suction drum
60: jetting unit
62: inkjet head
62K: inkjet head
62C: inkjet head
62M: inkjet head
62Y: inkjet head
70: third suction drum
80: fourth suction drum
82: image sensor
90: winding unit
92: winding roll
100: substrate transport mechanism
200: processor
202: memory
204: communication unit
206: user interface
210: integrated control unit
220: unwinding control unit
222: transport control unit
230: pre-coat control unit
234: pre-coat drying control unit
260: jetting control unit
262: user image printing control unit
264: jetting state monitoring pattern printing control unit
266: non-product image position information printing control unit
290: winding control unit
292: jetting state monitoring unit
294: image examination unit
300: user image
300A: user image
300B: user image
302: jetting state monitoring pattern
304: non-product image position information
304A: non-product image position information
304B: non-product image position information
304C: non-product image position information
S10 to S20: each step of printing method

What is claimed is:

1. An inkjet printing device comprising:
a medium transport mechanism that transports a continuous medium in a medium transport direction;
an inkjet head that prints a user image on the continuous medium;
one or more processors; and
one or more memories that are connected to the one or more processors and store commands which are able to be executed by using the one or more processors, wherein:
the one or more processors read out the commands from the one or more memories and print non-product image position information including information on a position of a non-product image printed on the continuous medium in the continuous medium;
the non-product image is constituted of at least one of ink of dummy jet or a jetting state monitoring pattern received from the inkjet head; and
the non-product image position information is stored in the one or more memories according to image data of the non-product image, and is printed in a termination region of the continuous medium in printing of the user image and at a position on a downstream side of a region in which the non-product image is printed in the medium transport direction.

2. The inkjet printing device according to claim 1, further comprising:
a head for non-product image position information printing that is different from the inkjet head and that is used in a case of printing the non-product image position information.

3. The inkjet printing device according to claim 1, wherein the one or more processors print the non-product image position information in an image printing region next to the region in which the non-product image is printed in the medium transport direction.

4. The inkjet printing device according to claim 3,
wherein the one or more processors print the non-product image position information in an end region of the continuous medium in a direction orthogonal to the medium transport direction.

5. The inkjet printing device according to claim 3,
wherein the one or more processors print the non-product image position information to be superimposed on the user image by using a transparent ink.

6. The inkjet printing device according to claim 1,
wherein the non-product image position information has a length in the medium transport direction to shorter than a length of the user image, and includes information on the length of the non-product image position information in the medium transport direction.

7. The inkjet printing device according to claim 1,
wherein the non-product image position information includes jetting state information indicating a jetting state of the inkjet head.

8. An inkjet printing device comprising:
a medium transport mechanism that transports a continuous medium in a medium transport direction;
an inkjet head that prints a user image on the continuous medium;
one or more processors; and
one or more memories that are connected to the one or more processors and store commands which are able to be executed by using the one or more processors, wherein:
the one or more processors read out the commands from the one or more memories and print non-product image position information including information on a position of a non-product image printed on the continuous medium in the continuous medium;
the non-product image is constituted of at least one of ink of dummy jet or a jetting state monitoring pattern received from the inkjet head; and
the non-product image position information is stored in the one or more memories according to image data of the non-product image, and is printed in a termination region of a print job in the medium transport direction and at a position on a downstream side of a region in which the non-product image is printed in the medium transport direction.

9. The inkjet printing device according to claim 8, further comprising:
a head for non-product image position information printing that is different from the inkjet head and that is used in a case of printing the non-product image position information.

10. The inkjet printing device according to claim 8,
wherein the one or more processors print the non-product image position information in an image printing region next to the region in which the non-product image is printed in the medium transport direction.

11. The inkjet printing device according to claim 10,
wherein the one or more processors print the non-product image position information in an end region of the continuous medium in a direction orthogonal to the medium transport direction.

12. The inkjet printing device according to claim 10,
wherein the one or more processors print the non-product image position information to be superimposed on the user image by using a transparent ink.

13. The inkjet printing device according to claim 8,
wherein the non-product image position information has a length in the medium transport direction shorter than a length of the user image, and includes information on the length of the non-product image position information in the medium transport direction.

14. The inkjet printing device according to claim 8,
wherein the non-product image position information includes jetting state information indicating a jetting state of the inkjet head.

15. A printing method comprising:
transporting a continuous medium in a medium transport direction;
printing an image on the continuous medium by using an inkjet head; and
printing non-product image position information including information on a position of a non-product image formed on the continuous medium in the continuous medium, wherein:
the non-product image is constituted of at least one of ink of dummy jet or a jetting state monitoring pattern received from the inkjet head; and
the non-product image position information is stored in one or more memories according to image data of the non-product image, and is printed in a termination region of the continuous medium in printing of the image and at a position on a downstream side of a region in which the non-product image is printed in the medium transport direction.

16. A printing method comprising:
transporting a continuous medium in a medium transport direction;
printing an image on the continuous medium by using an inkjet head; and
printing non-product image position information including information on a position of a non-product image formed on the continuous medium in the continuous medium, wherein:
the non-product image is constituted of at least one of ink of dummy jet or a jetting state monitoring pattern received from the inkjet head; and
the non-product image position information is stored in one or more memories according to image data of the non-product image, and is printed in a termination region of a print job in the medium transport direction and at a position on a downstream side of a region in which the non-product image is printed in the medium transport direction.

* * * * *